US011719554B2

(12) United States Patent
Patault et al.

(10) Patent No.: US 11,719,554 B2
(45) Date of Patent: Aug. 8, 2023

(54) DETERMINING DISSIMILARITIES BETWEEN DIGITAL MAPS AND A ROAD NETWORK USING PREDICTED ROUTE DATA AND REAL TRACE DATA

(71) Applicant: Uber Technologies, Inc., San Francisco, CA (US)

(72) Inventors: Armelle Patault, San Francisco, CA (US); Rifat Berk, San Francisco, CA (US); Berk Gurakan, Palo Alto, CA (US)

(73) Assignee: Uber Technologies, Inc., San Francisco, CA (US)

( * ) Notice: Subject to any disclaimer, the term of this patent is extended or adjusted under 35 U.S.C. 154(b) by 305 days.

(21) Appl. No.: 16/376,940

(22) Filed: Apr. 5, 2019

(65) Prior Publication Data

US 2020/0240791 A1    Jul. 30, 2020

Related U.S. Application Data

(60) Provisional application No. 62/797,108, filed on Jan. 25, 2019.

(51) Int. Cl.
*G01C 21/00* (2006.01)
*G01C 21/34* (2006.01)
*G06F 16/29* (2019.01)

(52) U.S. Cl.
CPC ..... *G01C 21/3815* (2020.08); *G01C 21/3415* (2013.01); *G01C 21/3453* (2013.01); *G06F 16/29* (2019.01)

(58) Field of Classification Search
CPC ...... G01C 21/36; H04L 67/12; G05D 1/0088; G05D 2201/0213; H04W 4/029; H04W 4/02; G07C 5/008; G06N 20/00
See application file for complete search history.

(56) References Cited

U.S. PATENT DOCUMENTS

2011/0196601 A1* 8/2011 Miura ................ G01C 21/3697
701/532
2012/0143492 A1* 6/2012 Johnson ............. G01C 21/3415
701/411

(Continued)

FOREIGN PATENT DOCUMENTS

JP     2008052282 A  *  3/2008  ............. G01C 21/30

OTHER PUBLICATIONS

Alexander Kostin, "A simple and fast multi-class piecewise linear pattern classifier", Nov. 2006, Pattern Recognition, vol. 39, Issue 11, pp. 1949-1962 (Year: 2006).*

(Continued)

*Primary Examiner* — Rachid Bendidi
*Assistant Examiner* — Selena M Jin
(74) *Attorney, Agent, or Firm* — Fenwick & West LLP

(57) ABSTRACT

A network system determines dissimilarities between a digital map and trace data of a road network in an area as service providers and service requestors coordinate service using the road network in the area. To determine dissimilarities the network system can determine a suggested route, determine a predicted route, receive executed trace data, and compare the predicted route data to the executed trace data for the suggested route. The network system may aggregate trace data when determining a dissimilarity. The network system can quantify the differences between traces to determine dissimilarities. Quantifications can include, ratios, bounds, and scores. The network system can determine an alternate route if a dissimilarity indicates that the state of a road segment has changed (e.g., from "open" to "closed"). The network system can modify guidance instructions if a dissimilarity indicates that a guidance instruction is misleading.

19 Claims, 7 Drawing Sheets

(56) References Cited

U.S. PATENT DOCUMENTS

2013/0345955 A1* 12/2013 Tashiro ................... G08G 1/00
                                                                                  701/118
2014/0143184 A1* 5/2014 Koukoumidis ...... G09B 29/106
                                                                                   706/12
2016/0275787 A1* 9/2016 Kesting ................... G06F 16/29

OTHER PUBLICATIONS

Adachi et al., "English Translation of JP-2008052282-A", Mar. 2008 (Year: 2008).*

* cited by examiner

DETERMINING DISSIMILARITIES BETWEEN DIGITAL MAPS AND A ROAD NETWORK USING PREDICTED ROUTE DATA AND REAL TRACE DATA

CROSS REFERENCE TO RELATED APPLICATIONS

This application claims the benefit of priority to U.S. Provisional Application No. 62/797,108, filed Jan. 25, 2019, the disclosure of which is hereby incorporated by reference herein in its entirety for all purposes.

BACKGROUND

Field

This description relates generally to determining dissimilarities between maps and ground truth data for a road network and more particularly to using route differences between suggested routes and executed routes to determine a dissimilarity.

Description of the Related Art

Digital maps are often used to provide route guidance. Map data typically includes features such as roads, bodies of water, points of interest, and the like, which are used to render the maps. Map data also typically includes information about how the map can be traversed for example, a map that includes road networks typically has associated data describing how the road network can be used, including direction of travel (one way, two way), whether turns are permitted at various intersections, etc.

As features such as roads are added to and removed from the road network, and as rules for how the network can be traversed are changed, the map data becomes stale and requires updating to remain effective.

SUMMARY

Dissimilarities between a digital map and a road network are problematic in transport service coordination. For example, dissimilarities can cause a network system to generate a suggested route that cannot be traversed by a transportation vehicle operated by a service provider who is providing transport service to a service requestor. Additionally, fixing dissimilarities between a map and an actual road network is difficult. More particularly, ensuring that a map accurately reflects an ever-evolving road network in an area is technically challenging.

A network system determines dissimilarities using predicted route data and executed trace data for a suggested route. Predicted route data is trace data (i.e., position, velocity, acceleration data, etc.) expected to be received from service providers and service requestors coordinating transport service using the suggested route. Realized routes are trace data actually received from service providers and service requestors coordinating transport service and provided the suggested route. The network system may aggregate the trace data (both predicted and executed) to more accurately determine dissimilarities. When predicted route data and realized route data are different, this difference can be indicative of a dissimilarity. The network system can quantify the differences between the predicted route data and executed trace data in a variety of manners. Based on the quantification of the differences, the network system can determine whether a dissimilarity exists, and what type of dissimilarity it is.

In one embodiment, the network system quantifies differences by generating a path from the trace data. A path is a representation of a number of road segments and nodes expected to be traversed and/or actually traversed for a suggested route. The network system can quantify the differences between predicted paths and expected paths by calculating expectation ratios, bounds, and state scores. Based on the state scores, the network system can determine if a path, or a road segment in a path, includes a dissimilarity.

The network system may determine an alternate route if the state of a road segment has changed based on a state score. For example, a state score may indicate that a road state is "closed" or "open." If the network system detects a dissimilarity indicating that a road segment changed from "open" to "closed", the network system may generate alternate routes that avoid that road segment.

The network system may modify guidance instructions for a suggested route to improve transport service coordination based on a state score. For example, a state score may indicate that a guidance instruction for a suggested route is misleading and causing service providers to traverse an incorrect route rather than a suggested route. In response, the network system may modify the guidance instruction such that fewer service providers traverse the incorrect route.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to various embodiments by way of illustration only. It should be noted that from the following discussion, alternative embodiments of the structures and methods disclosed herein will be readily recognized as viable alternatives that may be employed without departing from the principles of what is claimed.

System Environment

A digital map ("map") in a network system can be used to facilitate service coordination between two parties operating client devices within a system environment. For example, a network system may be used to coordinate a transportation service between a service provider and a service requestor. Maps in the network system may be used for many purposes within this context. For example, maps may be used when determining routing information, relative position, travel time estimations, fare calculations, guidance instructions, road network states, etc.

Maps used by a network system, generally, include a road network representing an area in which the transportation service is being coordinated. Maps may be obtained from a third party or created in some other manner. However, in some cases, maps may have been created inaccurately. In addition, over time, the road network in the environment may change and the maps are no longer an accurate representation of that environment. In such cases, routes that are suggested for a transportation service may be inaccurate. For example, a suggested route may include a turn that is illegal, a road segment that is closed, etc. As such, a service provider may not be able to follow a suggested route determined from the map for the transportation service. In these cases, trace data from client devices traversing suggested routes—that is, data representing the actual movement of a client device as it traverses a suggested route through the road network—can be used to determine a difference ("dissimilarity") between the road network represented in a map and the current road network. In other words, a dissimilarity is a determined difference between a physical road network and its digital representation in a map. Determined dissimilarities may be output as a data structure for verification, used to improve guidance instructions, and/or suggest alternate routes.

Figure 1:
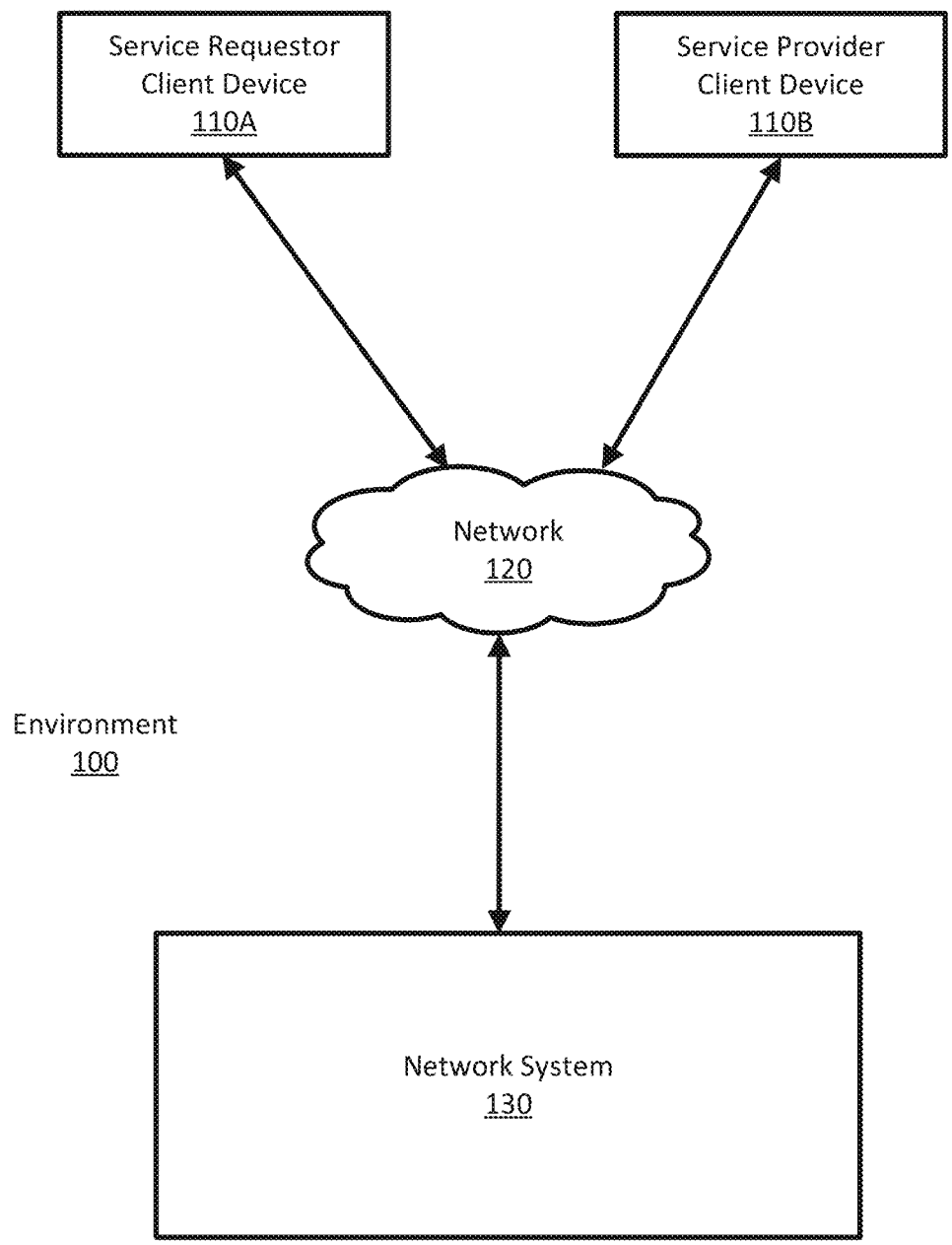
FIG. 1 is a diagram of an environment for determining dissimilarities between maps and a current road network using trace data from client devices travelling suggested routes, according to one embodiment.
Figure 3:
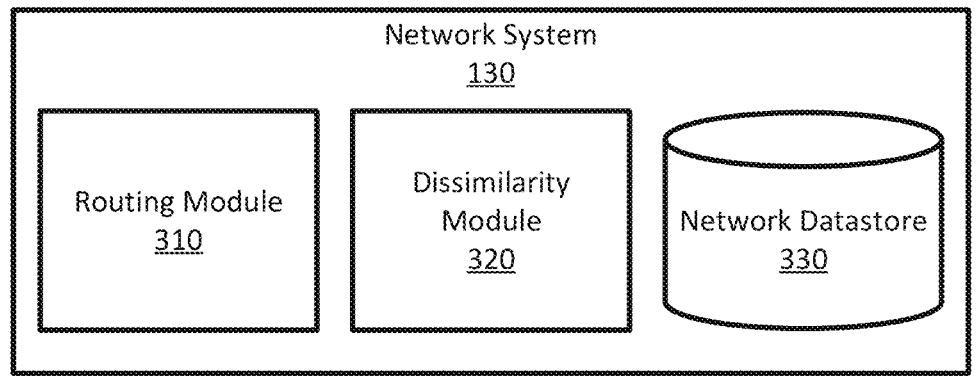
FIG. 3 illustrates a network system, according to one example embodiment.
Figure 4:
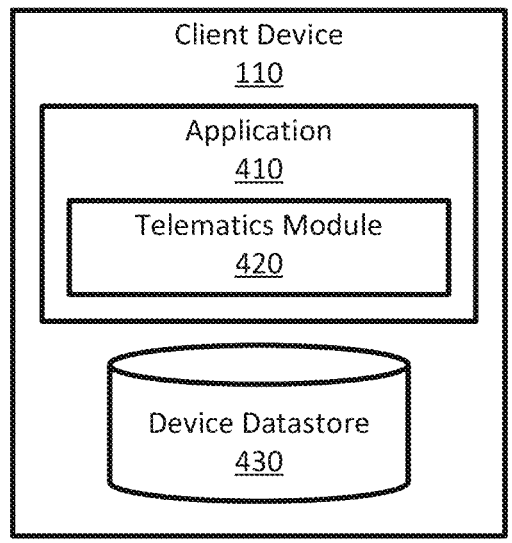
FIG. 4 illustrates a client device, according to one example embodiment.

FIG. 1 is a diagram of an environment 100 for determining dissimilarities between maps and the current road network using trace data from client devices travelling suggested routes, according to one embodiment. The environment 100 includes a service requestor client device 110A, a service provider client device 110B, a network 120, and a network system 130. FIG. 3 is a more detailed illustration of a network system 130, according one example embodiment. FIG. 4 is a more detailed illustration of a client device 110, according to one example embodiment.

The service requestor client device 110A and the service provider client device 110B are configured to obtain trace data as devices 110 coordinate transport service using a road network in the environment 100. Trace data can include position, velocity, acceleration, or any other service, geographic, or location-based information. Generally, a client device 110 gathers trace data from sensors on the client devices 110 (e.g., a global positioning system, accelerometers, etc.). In one embodiment, client device 110 associates gathered trace data with the current position of client device 110 as it traverses the current road network and sends the trace data to network system 130. Accordingly, because the trace data depicts actual movement through the road network, it provides a current representation of the road network in the area.

Network system 130 facilitates service coordination between devices using maps of the road network in the environment 100. As such, network system 130 includes a datastore that stores historical maps of the road network in the area such that network system 130 can reference the road network when coordinating transport service. In one embodiment, the road network may be represented in the network system 130 as sets of road segments connected by nodes and identified by coordinates. Further, the road network includes a connection ruleset that defines allowable ways for the road segments and nodes to be connected (e.g., direction of travel, speed, etc.). The road segments, nodes, and connection ruleset, in aggregate, form a representation of a road network in the geographic area of the environment 100.

The network system 130 may determine a suggested route from a first location to a second location when coordinating a transport service. For example, the network system 130 can access a map of the road network in the environment 100 and generate a suggested route including the appropriate road segments, nodes, and connection information ("route information") to allow a service provider to transport a service requestor from the first location to the second location using the road network. A suggested route may also include the route information for any other routes suggested during transport service. For example, a service provider may begin providing transport service using an initial suggested route. During transport service, the service provider is provided a secondary suggested route and begins to provide transport service for this according to the secondary suggested route. In this example, the suggested route includes the route information for both the initial suggested route and the secondary suggested route.

In some cases, trace data received from client devices 110 traversing suggested routes ("realized routes") is dissimilar from trace data predicted for a client device for that suggested route ("predicted routes"). In other words, realized routes include route information collected by client devices 110 coordinating transport service provided a suggested route. Similarly, predicted routes include route information expected (or predicted) to be received from client devices 110 coordinating transport service provided the suggested route. When a predicted route and a realized route reflect different route information ("route difference"), the route difference may indicate that a service provider did not wholly adhere to the suggested route when providing transport service. In some cases, a route difference may not indicate a dissimilarity. For example, a service provider may prefer an alternate route to the suggested route, a service provider may miss a turn, etc.

Network system 130 can match trace data from predicted routes and/or realized routes to road segments of a map. For example, a service provider provides transport service by travelling down a first road segment, turning left onto a second road segment, and turning right onto a third road segment. All of the road segments correspond to a road segment in a map. The realized route for the transport service includes a group of GPS coordinates representing the coordinates of the service provider as it traverses the road segments. Network system 130 matches the group of GPS coordinates to corresponding road segments in the map. For example, a first subset of the coordinates represents the first road segment and are matched to the first segment in the map, a second subset of the coordinates represent the second road segment and are matched to the second segment of the map, etc. In this manner, a route (suggested, realized, predicted) may be represented by map matched road segments rather than, or in addition to, trace data representing the route.

Network system 130 can determine a dissimilarity using route differences determined from predicted routes and realized routes of client devices coordinating transport service. Network system 130 can generate an alternate route for a suggested route, determine state changes for road segments, generate corrective guidance instructions, and/or indicate incorrect guidance instructions for a suggested route based on a determined dissimilarity and route difference.

Figure 2:
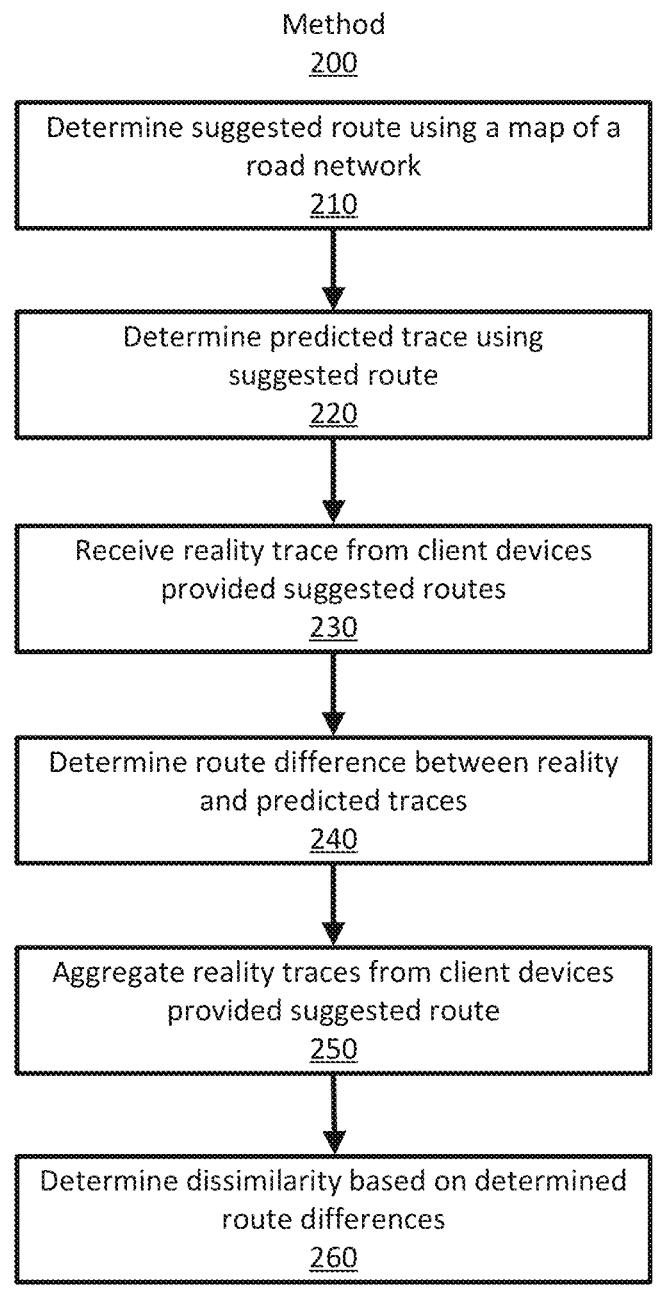
FIG. 2 is a process for determining a dissimilarity between a road network and a map using a route difference determined from realized routes received from client devices provided with suggested routes, according to one example embodiment.

As an example, FIG. 2 is a process 200 for determining a dissimilarity between a road network and a map using a route difference determined from realized routes received from client devices 110 provided with suggested routes, according to one example embodiment.

To begin, network system 130 determines 210 a suggested route for a transport service from a first location to a second location using a map of a road network stored by network system 130. The suggested route includes route information that allows a service provider to transport a service requestor from the first location to the second location. Network system 130 also generates 220 a predicted route for the suggested route that includes the route information of the suggested route. Generally, a suggested route includes the road segments and nodes for a transport service, while a predicted route represents trace data expected to be received from a client device traversing the suggested route. So, for example, a predicted route may include a set of coordinates representing the road segments expected to be traversed on the suggested route. The predicted route may also include time information for the set of coordinates. In some configurations, the predicted route may be the same as the suggested route and only include the segments and nodes of a suggested route.

As an example, Dan (i.e., the service requestor) requests transport service from her house to a movie theater using her client device 110A. The network system 130 receives the request and facilitates the providing of transport service to Dan by Christine (i.e., the service provider) from her house to the movie theater using a transportation vehicle. Network system 130 accesses a map of a road network including the house and the movie theater and determines 210 a suggested route. The suggested route includes route information that allows Christine to transport Dan from her house to the movie theater. Network system 130 transmits the suggested route to Christine's client device 110B via network 120. Network system 130 also determines 220 a predicted route for the suggested route that includes route information for the suggested route from Dan's house to the movie theater. The predicted route includes a set of coordinates approximating trace data expected to be received by Christine and Dan as they traverse the road network. Network system 130 may also include an abstraction of the approximated trace data at the level of road segments and nodes similar to the suggested route.

Client devices 110 traversing routes within the road network obtain realized routes. The realized routes include route information describing the route that each service provider actually takes when providing transport service. Thus, when a client device traverses a suggested route the realized route reflects route information for the suggested route and when a client device does not traverse the suggested route it reflects route information for an alternate route. The client devices 110 transmit the realized routes via the network 120 and the network system 130 receives 230 the realized routes. As an example, Christine is providing transport service to Dan in a transportation vehicle. While providing transport service, Christine is traversing the road network from Dan's house to the movie theater using, at the beginning of transport service, the suggested route received from the network system 130. Christine and/or Dan's client device 110 obtains a realized route reflecting the route that Christine traverses from Dan's home to the movie theater and transmits the realized route to network system 130. In this example, after some time, Christine and Dan take a detour from the suggested route because a recent construction project in the area has started and the suggested route is no longer accurate. In other words, Christine and Dan begin taking an alternate route. Thus, as part of normal trace data collection, Christine and Dan's client devices 110 obtain a realized route reflecting the detour and alternate route.

Network system 130 determines 240 a route difference between a received realized route for a suggested route and the predicted route for that suggested route. For example, Christine and Dan's realized route indicated that they took a detour to avoid the construction when provided with the suggested route. As such, realized routes from their client devices 110 reflect a route difference between the realized route and the predicted route for that suggested route. The route difference can indicate which road segments, nodes, and/or connection information are different between the suggested route and the route taken by Christine and Dan on the detour.

Network system 130 aggregates 250 realized routes received from client devices 110 that were provided with suggested routes. Aggregating realized routes allows network system 130 to determine a likelihood that specific realized routes reflect a dissimilarity between the map and the current road network. For example, the construction project in the area is new and Christine and Dan are one of the first transport services that are forced to take a detour. Network system 130 continues to receive 230, and aggregate 250, realized routes from client devices 110 that take a detour when provided a suggested route that includes the construction project.

Network system 130 determines 260 a dissimilarity using aggregated realized routes received from a plurality of client devices 110 provided the suggested route. Determining dissimilarities is described in more detail below. As an example, client devices 110 provided the suggested route continue to take detours due to the construction project. As such, many realized routes received from client devices 110 indicate a route difference between the realized route and the predicted route for the suggested route. Due to the increased number of route differences caused by the construction project, network system 130 determines 260 that there is a dissimilarity between the map used to generate the suggested route and the current road network at the location of the construction project.

Figure 6:
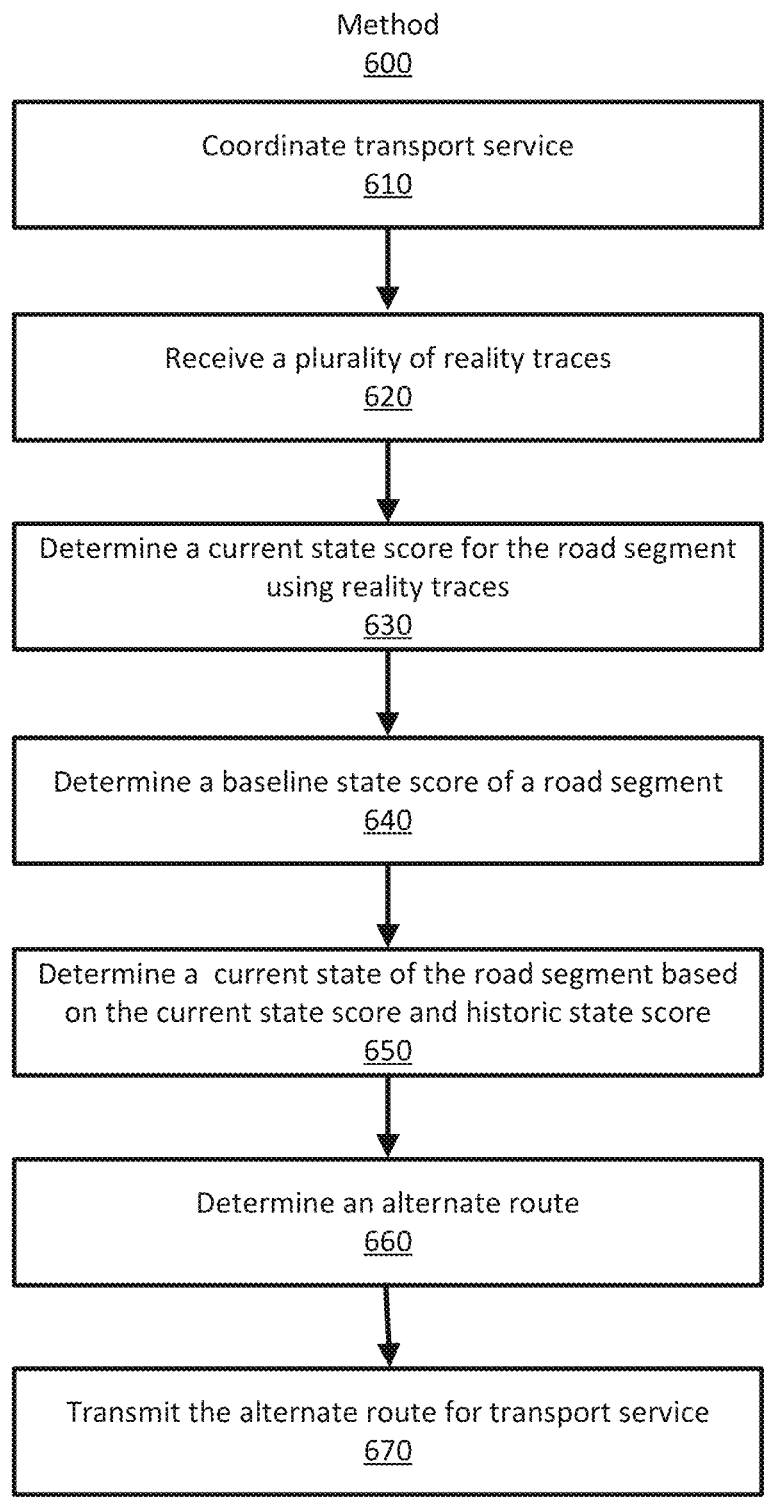
FIG. 6 is a flow diagram illustrating a process for determining an alternate route for a transport service based on route differences, according to one example embodiment.

Network system 130 can determine an alternate route for a suggested route based on the dissimilarity and received realized routes as described in regards to FIG. 6. For example, using Christine and Dan's realized routes, network system 130 can determine an alternate route that avoids the construction project.

Figure 7:
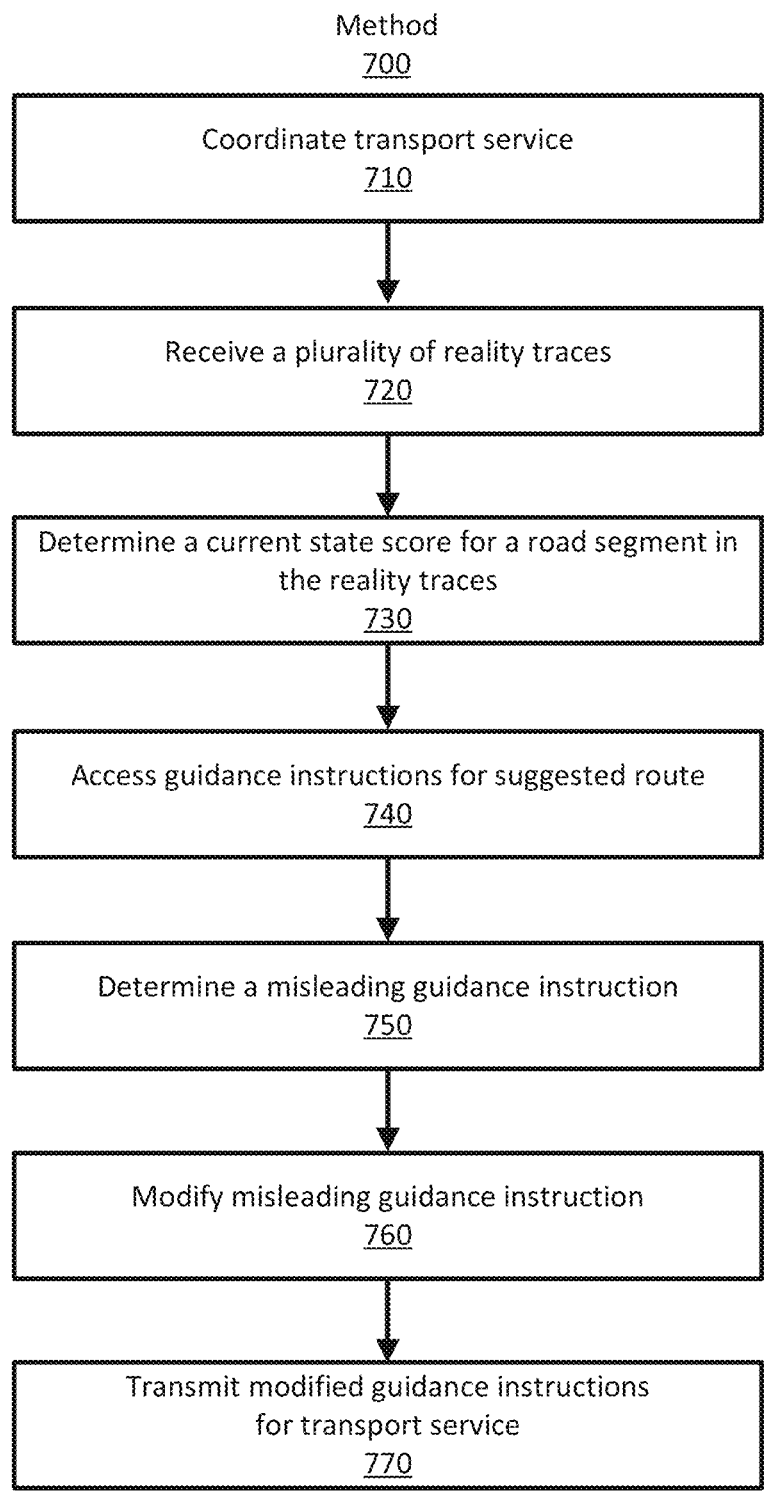
FIG. 7 is a flow diagram illustrating a process for modifying guidance instructions for a transport service based on route differences, according to one example embodiment.

Network system 130 can also determine alternative guidance instructions for a suggested route based on the dissimilarity and received realized routes as described in regard to FIG. 7. Consider, for example, that Christine and Dan miss a turn when traversing a suggested route due to a misleading guidance instruction rather than a construction project. In this case, Christine and Dan's realized routes include a route difference due to the misleading guidance instruction. In this case, network system 130 may determine that route differences stem from the misleading guidance instructions and can generate modified guidance instructions that reduce the number of service providers missing the turn.

Network system 130 can generate a data structure describing a detected dissimilarity. The data structure may describe a variety of information about a detected dissimilarity. The information may include, for example, a likelihood, a location, a type, a confidence, or any other information describing a determined dissimilarity. In some examples, network system 130 can use aggregated data to determine any number of dissimilarities for any number of road segments in the road network. In this case, network system 130 can output a data structure describing all of the determined dissimilarities in the road network.

Service Coordination

Returning to FIG. 1, the illustrated environment 100 includes client devices 110 and a network system 130 that enable service coordination via a network 120, according to one example embodiment. Within the environment 100, network system 130 determines dissimilarities using predicted routes and realized routes as client devices coordinate service. FIG. 3 gives a more detailed view of modules within network system 130 and FIG. 4 gives a more detailed view of modules within a client device 110), according to some example embodiments. Some embodiments of client devices 110 and network system 130 have different modules than those described herein. Similarly, functionality of the client devices 110 and network system 130 can be distributed among the modules in a different manner than is described herein.

Network system 130 enables service coordination in the environment 100 between client devices 110. Users of network system 130 may include providers that provide a service to other users. In an example use case, a provider operates a transportation vehicle to transport a user from a first location (e.g., pickup location) to a second location (e.g., a destination location). In some cases, the transportation vehicle may be autonomous. Other types of service include, for example, delivery of goods (e.g., mail, packages, or consumable items) or services. Although the embodiments herein for facilitating service coordination are described with respect to a transport service, the embodiments herein can be applied to any type of service that requires a service coordination via a network system 130 (e.g., food delivery, shopping, etc.).

As an example, network system 130 enables coordinating transport service between users of client devices 110 within the environment 100. In the context of the description, an operator of a transportation vehicle (i.e., the service provider) provides the service of transporting a person (i.e., the service requestor) to a destination requested by the person. In one embodiment, transportation vehicle includes all vehicles such as cars and motorcycles, as well as public transportation vehicles such as trains, light rail, buses, etc. In some cases, the transportation vehicle can be outfitted with a sensor suite that allows the user of client device 110 to obtain information about the road network, the environment 100, and the operational state of the transportation vehicle as the transportation vehicle traverses the road network.

Further, a client device 110 can correspond to a mobile computing device, such as a smartphone. In some cases, a client device 110 corresponds to an onboard computing system of an autonomous transportation vehicle. Network system 130 can also correspond to a set of servers and can operate with or as part of another system that implements network services. Network system 130 and client devices 110 comprise a number of "modules," which refers to hardware components and/or computational logic for providing the specified functionality. That is, a module can be implemented in hardware, firmware, and/or software (e.g., a hardware server comprising computational logic), other embodiments can include additional modules, can distribute functionality between modules, can attribute functionality to more or fewer modules, can be implemented as a standalone program or as part of a network of programs, and can be loaded into memory executable by processors.

In one embodiment, the transportation of a person from a pickup location to a destination location is referred to as a trip or a transport service. Referring to FIG. 3, routing module 310 of network system 130 calculates a suggested route from the pickup location to the destination location along a set of road segments within the environment 100 based on a map of the road segments within the environment 100. In some cases, routing module 310 can calculate a route from the current location of a service provider to a pickup location.

Routing module 310 can also determine a set of guidance instructions for a suggested route. Guidance instructions are any sort of instruction that may be presented by a client device 110 to a service provider and/or service requestor to facilitate providing transport service along a suggested route. Guidance instructions may include, audio cues, textual cues, visual icons, etc. In some examples, routing module 310 may receive and/or access guidance instructions from a third party service. Network system 130 transmits the guidance instructions to service providers and/or service requestors when coordinating transport service.

Additionally, routing module 310 can indicate when a client device 110 is using provided guidance instructions when providing a transport service. As such, realized routes received by network system 130 can be "unguided" or "guided" realized routes. Guided realized routes are realized routes received from a client device 110 using the guidance instructions when coordinating transport service. For example, routing module 310 provides a service provider with textual guidance instructions for display on their client device when providing transport service. The service provider allows application 410 to display the guidance instructions to facilitate transport service. Accordingly, routing module 310 labels realized routes received from the client device as guided realized routes. Unguided realized routes are realized routes received from a client device not using the guidance instruction when coordinating transport service. In a first example, a service provider receives audio guidance instructions along with a suggested route. Here, the service provider disables audio playback of guidance instructions using application 410 of their client device 110 when providing transport service. Instead, the service provider relies on personal knowledge of the road network to provide transport service from a first location to a second location. In a second example, the service provider operates the application 410 in an overview mode. Overview mode displays an entire suggested route rather than just a portion of the suggested route and does not provide guidance instructions to the service provider. When providing transport service, the service provider may not completely adhere to the presented suggested route. Accordingly, in both examples, routing module 310 labels realized routes received from the client device as unguided realized routes.

Generally, routing module 310 calculates transaction costs for transport services and coordinates those transport services. A transaction cost is a monetary payment from a service requestor to a service provider in exchange for the service provider transporting the service requestor to a destination location. Routing module 310 may calculate the transaction cost for a transport service based on the distance traveled along the route during the trip (and/or based on a duration of the trip, any applicable tolls, fees, etc.). Routing module 310 determines the distance traveled during the transport service using geographic information (e.g., telematics data) received from client devices (e.g., such as after completion of the transport service). In some examples, other modules within the environment 100 can determine the distance traveled during the transport service. Further, information from other modules may be used in determining transaction costs for a transport service.

Network system 130 receives (e.g., periodically) geographic information from a client device 110 included in a transportation vehicle as the transportation vehicle moves its position. The geographic information includes geographic points that describe a trip of the transportation vehicle. In one embodiment, the geographic information is global positioning system (GPS) information. Throughout the description, geographic information is referred to as telematics data, but the description herein can be applied to any other type of geographic coordinate system.

Network system 130 also includes a network datastore 330. The network datastore is a storage device (e.g., a hard-drive, etc.) capable of storing information to facilitate service coordination. For example, the network datastore 330 may store a map that can be used to determine a suggested route. Network datastore 330 may also store other information for determining dissimilarities in a map, such as, for example, historic state scores, route differences, and trace data, etc. Network datastore 330 may also store guidance instructions for use in coordinating transport service in the environment 100.

As shown in FIG. 1, network system 130 is in communication with a service provider client device 110B and the service requestor client device 110A via a network(s) 120. In one embodiment, the network 120 is the Internet or any combination of a LAN, a MAN, a WAN, a mobile, wired or wireless network, a private network, or a virtual private network. While only a single service provider client device 110B 149A and a single service requestor client device 110A are shown in FIG. 1, any number of client devices 110 can be in communication with network system 130 via the network 120. Further, while described as a service requestor client device 110A and a service provider client device 110B, any client device 110 within the environment 100 can include functionality for being a service requestor or a service provider.

Referring to FIG. 4, a client device 110 is an electronic device (e.g., a smartphone) that can interact with network system 130 over the network 120. As described herein, client devices 110 for service requestors and service providers are largely similar in that they can include an application 410 that facilitates transport service. The application 410 includes a telematics module 420 to determine telematics data. The client device 110 may also include a device datastore 430 for storing any relevant information that can facilitate transport service in the environment 100.

When the client device 110 is a service requestor device 110A, the service requestor device 110A is used by a person to request a transport service from a pickup location to a destination location via a client application 410 included in the service requestor device 110A. Application 310 allows the user of the service requestor device 110A to submit a transport service request, which network system 130 then processes in order to select an operator of a transportation vehicle as a transport service provider.

According to some examples, the transport service request may include (i) a user identifier (ID), (ii) a pickup location (e.g., a location identifier specified by the user), (iii) a destination location, (iv) a vehicle type, and/or (v) a requestor location. For example, the telematics module 420 uses sensors (e.g., a GPS receiver) included in the service requestor device 110A to determine the requestor location of the service requestor device 110A at various instances in time. The requestor location of the service requestor device 110A may be represented by a location identifier such as latitude and longitude coordinates ("location coordinate").

The current position of the service requestor device 110A is also associated with a time stamp indicating the time and the date in which the telematics module 420 measured the current position of the service requestor device 110A. In some examples, the pickup location and/or the current location of the service requestor device 110A may be manually inputted into the service requestor device 110A by the user of the device, such as by selecting a location on a map or in the form of an address including at least a street number and street name.

The coordination service, which is implemented by network system 130 and/or other servers or systems, can receive the transport service request over the network 120 and can select a service provider for the requestor. In one example, the coordination service can (i) identify a pool of service providers that are available to provide the requested service and satisfy one or more conditions (e.g., have the specified vehicle type, have sensor system, have a preferred route to the pickup location, and/or are within a predetermined distance or estimated travel time away from the pickup location), (ii) select a service provider from the pool of service providers, and (iii) transmit an assignment request to a service provider client device 110B. The invitation can include the pickup location so that the selected service provider can navigate to the pickup location for initiating the transport service for the requestor. If the selected service provider accepts the assignment request by providing input on the service provider client device 110B, application 410 transmits an assignment acceptance to network system 130. Accepting the assignment can associate the service provider and the service requestor for transport service and network system 130 can notify the service requestor device 110A accordingly.

When the client device 110 is a service provider client device 110B, it is, generally, an electronic device (e.g., a smartphone) operated by a service provider and located within the transportation vehicle used to complete transport service. The service provider client device 110B includes a client application 410. The client application 410 displays, on the service provider client device 110B, information about a trip that the service provider has agreed to provide, such as the pickup location, and/or navigation and/or mapping information instructing the service provider to travel to the pickup location. As referred to herein, the pickup location may be the location of the service requestor device 110A or a location specified by the user of the service requestor device 110A. The destination location may be the location the service provider ends transport service, or a location specified by the user of the service requestor device 110A. The client application 410 may also display, on the service provider client device 110B, the destination for the assigned trip if provided by the user of the service requestor client device 110A.

Client devices 110 include a telematics module 420. Telematics module 420 uses one or more sensors of client device 110 to identify telematics data from the service provider client device 110B and the service requestor device 110A. When client application 410 is a transport service coordination application, telematics module 420 can identify GPS data from the client device 110 as the service provider navigates a transportation vehicle along one or more road segments and nodes to complete a trip. The GPS data of the transportation vehicle (or client device 110) represents the transportation vehicle's position at different instances in time during a trip. For example, at time $T_1$, client device 110 can be at a particular GPS location, identified by a location identifier (e.g., latitude and longitude coordinates) and a time stamp indicative of the time and date when client device 110 measured its current position. If the transportation vehicle is moving, at time T2 client device 110 can be at a different GPS location. In this manner, client device 110 periodically measures the current position of the transportation vehicle (e.g., every three seconds, every four seconds, etc.) and periodically provides GPS data that is representative of the position of the transportation vehicle over time to network system 130. Alternatively, client device 110 may provide GPS data whenever new or updated measurements of the current position of the transportation vehicle are taken or are available.

Determining Route Differences Using Predicted Routes and Realized Routes

Referring to FIG. 3, dissimilarity module 320 of network system 130 can determine route differences using predicted routes and realized routes. To illustrate determining a route difference using dissimilarity module 320, consider the description of FIG. 5.

Figure 5:
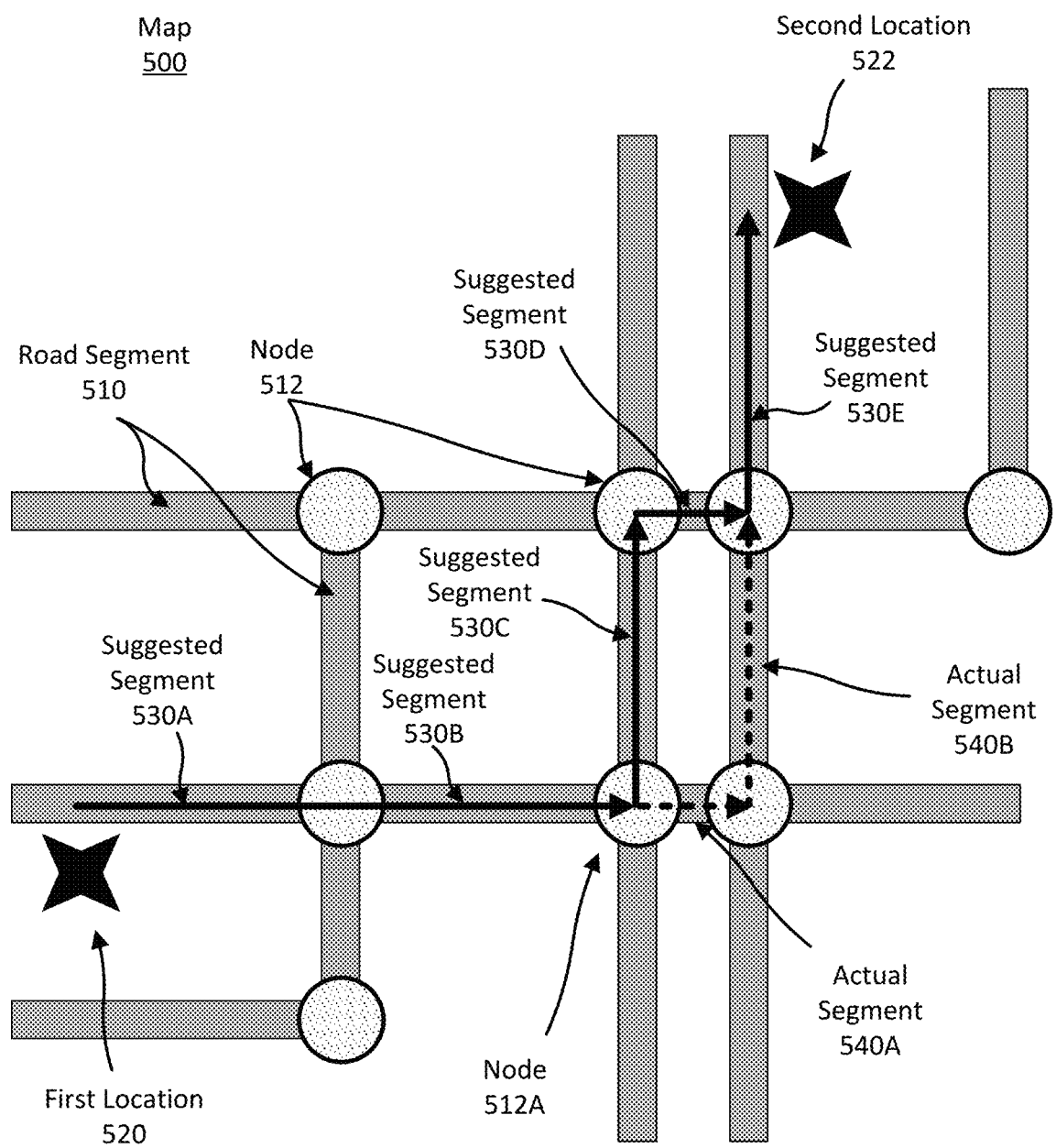
FIG. 5 illustrates a map of a road network including road segments, nodes, realized routes, and predicted routes that can be used to determine a route difference, according to one example embodiment.

FIG. 5 illustrates a map of a road network including road segments, nodes, realized routes, and predicted routes that can be used to determine a route difference, according to one example embodiment. As illustrated, map 500 includes a road network. The road network includes a number of road segments 510 connected by a number of nodes 512. The road segments 510 are illustrated as grey bars and the nodes 512 are illustrated as filled circles. While not illustrated, the map 500 also includes connection information for the road segments 510 and nodes 512 in the map.

Map 500 can be used to determine a suggested route when network system 130 coordinates a transport service. For example, a service requestor transmits a service request for transport service from a first location 520 to a second location 522. For convenience, the first location 520 and second location 522 are illustrated on coordinates outside the road network, however, the locations may have coordinates collocated to road segments 510 and/or nodes 512.

Routing module 310 determines a suggested route from the first location 520 to the second location 522. In this example, the suggested route includes suggested road segments 530A, 530B, 530C, 530D, and 530E. Here, the black arrows within the road segments represent the predicted routes for service providers providing transport service from the first location 520 to the second location 522 using the suggested route.

Network system 130 transmits the suggested route including the suggested road segments 530 to client devices 110 of service providers providing transport service from the first location 520 to the second location 522. Network system 130 receives realized routes from client devices 110 as service providers provide transport to service requestors from the first location 520 to the second location 522.

In this case, assume that map 500 includes incorrect connection information. Specifically, the road network does not allow a left turn at node 512A. As such, service providers cannot traverse suggested segment 530C by turning left from suggested segment 530B at node 512A. Instead, service providers continue transport service by traversing actual segments 540A and 540B in lieu of suggested segments 530C and 530D, respectively. In other words, the dashed lines within the road segments represent realized routes received from service providers providing transport service from the first location to the second location. Notably, realized routes coincide with predicted routes on suggested segments 530A, 530B, and 530E.

Dissimilarity module 320 determines there is a route difference for the suggested route because there are differences between predicted routes and realized routes. Network system 130 can quantify the route differences to determine a dissimilarity between map 500 and environment 100.

Determining Dissimilarities Between a Map and a Current Road Network

Consistent route differences may be indicative of a dissimilarity between a map and the current road network in the environment. Referring to FIG. 3, dissimilarity module 320 can quantify a route difference to determine a dissimilarity. Dissimilarity module 320 can quantify a route difference for every road segment in a realized route to determine a dissimilarity, and can quantify a route difference in a variety of manners. Generally, dissimilarity module 320 quantifies a route dissimilarity as how often each road segment in a predicted route is expected occur in a realized route for a suggested route. For convenience this quantification may be referred to herein as a state score. Other quantifications are also possible.

In one example dissimilarity module 320 calculates a state score using a two-segment approach. In the two-segment approach, dissimilarity module 320 defines trace data as a set of paths. Referring to FIG. 5, a path is a pair of road segments, (e.g., 530B and 530C) including an incoming road segment (e.g., 530B) to a node (e.g., node 512A) and an outgoing road segment (e.g., 530C) from the node (e.g., node 512A). Notably, dissimilarity module 320 defines path for both realized routes and predicted routes.

Dissimilarity module 320 calculates an expectation ratio R for each path in a suggested route of a transport service. In one example, dissimilarity module 320 calculates the expectation ratio R as:

$$R = \frac{N_R}{N_P} \quad (1)$$

where $N_R$ is the number of times a path occurs in realized routes and $N_P$ is the number of times the path occurs in the predicted routes.

Dissimilarity module 320 calculates a bound B for the expectation ratio R. In one example, the dissimilarity module 320 calculates the bound B as:

$$B = \{R + t_{\beta,n-1} \frac{s}{\sqrt{N_P}} \text{ if} \quad (2)$$
$$R > 0 \ 1 - \frac{1}{\alpha^{N_P+1}} \text{ if}$$
$$R = 0$$

where s is the variance of the expectation ratio R, t is the t-score, $\alpha$ is 0.5, and $\beta$ is 0.75. $\alpha$ and $\beta$ can be other values.

Dissimilarity module 320 calculates a general state score SG using the bound B. In one example, dissimilarity module 320 calculates general state score SG as:

$$S_G = \frac{1}{B} \quad (3)$$

Given this formulation, a high general state score SG indicates that a path is likely to include a dissimilarity. That is, the road network in the environment 100 is dissimilar from the map 500 when the general state score SG is high.

In another example, dissimilarity module 320 calculates a state score using a three-segment approach. The three-segment approach is similar to the two-segment approach but includes two nodes rather than a single node. In the three-segment approach, the outgoing segment of the first node is the incoming segment of the second node. In other words, a path includes a road segment incoming to a first node, a second road segment outgoing from the first node and incoming to a second node, and a third road segment outgoing from a second node.

In both the two-segment and the three-segment approach, dissimilarity module 320 calculates an under-constrained expectation ratio $R_U$ and an over-constrained expectation ratio $R_O$ for each path in a suggested route for a transport service. In one example, dissimilarity module 320 calculates the over-constrained expectation ratio $R_O$ as:

$$R_O = \frac{N_P}{N_R} \quad (4)$$

and the under-constrained expectation ratio $R_U$ as:

$$R_U = \frac{N_R}{N_P} \quad (5)$$

Dissimilarity module 320 calculates an under-constrained bound $B_U$ and an over-constrained bound $B_O$ for the under-constrained expectation ratio $R_U$ and the over-constrained expectation ratio $R_O$. In one example, dissimilarity module 320 the under-constrained bound $B_U$ and an over-constrained bound $B_O$ similarly to Equation 2.

Dissimilarity module 320 calculates an under-constrained state score Su and an over-constrained state score $S_O$ for the under-constrained bound $B_U$ and under-constrained bound, respectively. In one example, network system calculates the under-constrained state score Su and the over-constrained state score $S_O$ similarly to Equation 3.

A high under-constrained state score Su can be indicative of several types of dissimilarities, such as, for example, paths including extra road segments, paths including road segments wrongly considered as allowed in one way, and paths including road segments missing a turn restriction. A high over-constrained state score $S_O$ can be indicative of several types of dissimilarities, such as, for example, paths including road segments with extra turn restrictions.

For convenience, general state SG, under-constrained state-score Su, and over-constrained state score $S_O$, and may be referred to in aggregate as state score S.

Dissimilarity module 320 may associate a particular state score with a state of a road segment (or path) in a road network. A state of a road segment represents the travers-ability of a road segment or road segments included in a path. For example, a state score S above a threshold (e.g., 5000) may indicate that a road segment is "closed" while a state score S below a threshold (e.g., 100) may indicate that a road segment is "open." As another example, a state score S above a first threshold and below a second threshold may indicate that a road segment is "intermittently closed." As described above particular state scores may also indicate various types of dissimilarities.

A state score S for a road segment or path may be stored in network datastore 330. Accordingly, dissimilarity module 320 can determine differences in a state score S over time. To do so network system may access a previously determined state score(s) ("historic state score") for a road segment and compare the historic state score to a currently determined state score. In other words, historic state scores are a representation of how often a particular road segment is expected to occur in a realized route for a suggested route. Differences between a historic state score and a current state score may indicate a change in a state of a road segment or road segments in a path. For example, a particular road segment has a high historic state score, and, suddenly, the current state score is low. Network system can use a changing state score as indicator for a variety of possibilities, such as, for example, (i) the road segment state changed from "closed" to "open" or vice-versa, (ii) a guidance instruction associated with a road segment has improved, and (iii) a dissimilarity in a map has been remedied. Other examples are possible.

Dissimilarity module 320 may take various actions to improve accuracy in determining dissimilarities and route differences. For example, dissimilarity module 320 can filter state scores in a variety of manners to improve accuracy in determining dissimilarities. As some examples, network system can (i) disregard state scores for U-turns included in realized routes, (ii) disregard state scores for looping paths (e.g., traffic circles) included in realized routes, and (iii) for high over-constrained state scores, use route adherence metrics.

Dissimilarity module 320 can filter realized routes in a variety of manners to improve accuracy of state scores. As some examples, dissimilarity module 320 can (i) remove realized routes that represent allowable paths (i.e., removing false positives), (ii) remove realized routes with low horizontal accuracy, (iii) remove realized routes representing path s with below a threshold number of similar paths (i.e., statistically significant sampling). Other example filters are possible.

Dissimilarity module 320 can filter realized routes in the three-segment approach in using several specific approaches to improve the accuracy of state scores. For example, dissimilarity module 320 can filter paths having road segments that are in intersection of the road network. More specifically, dissimilarity module 320 can (i) use paths whose first and second road segments are road segments not included in intersections, (ii) remove paths having above a threshold (e.g., 3) number of road segments in an intersection, (iii) remove paths having more than a threshold number (e.g., 2) of consecutive in-intersection road segments. Other methods of removing intersections from paths are also possible.

Determining a Misleading Guidance Instruction

In some situations, dissimilarity module 320 can determine a misleading guidance instruction when a state score indicates a dissimilarity. In this case, the state score may indicate cases in which a dissimilarity between a map and a road network does not exist, but a significant number of route differences do exist. The route differences may be caused by guidance instructions that are misleading. A misleading guidance instruction can cause a service provider to traverse an incorrect route rather than the suggested route. For example, a misleading guidance instruction may cause service providers to miss a particular turn in a suggested route.

Dissimilarity module 320 determines a misleading score to quantify guidance instructions that may be misleading. The misleading score represents a likelihood that a particular guidance instruction causes a service provider to traverse an incorrect route rather than a suggested route. To calculate a misleading score, dissimilarity module 320 may define paths for predicted and realized routes using the two-segment or three segment approach described herein.

Dissimilarity module 320 calculates a path adherence ratio T for each path in a suggested route of a transport service. In one example, network system 130 calculates the path adherence T as:

$$T = \frac{N_R}{N_P} \quad (6)$$

where $N_R$ is the number of times a path occurs in realized routes and $N_P$ is the number of times the path in the predicted routes.

Additionally, when calculating the path adherence ratio T, dissimilarity module 320 may filter realized routes based on whether or not the realized route reflects are a reroute of a suggested route. In an example, the dissimilarity module 320 filters all road segments and/or turns in a suggested route after the first turn of a reroute. To illustrate, a suggested route includes six road segments. After the third road segment, a service provider traversing the suggested routes takes a turn not included in the suggested route. Thus, the dissimilarity module filters the fourth, fifth and sixth road segments from the suggested route when calculating the turn adherence ratio.

Dissimilarity module 320 calculates a guided path adherence ratio $T_g$ and an unguided path adherence ratio $T_u$. A guided path adherence ratio $T_g$ is the path adherence ratio T in which guidance instructions are presented to a service provider when providing transport service using the suggested route (i.e., using guided realized routes). An unguided path adherence ratio $T_u$ is the path adherence ratio T in which guidance instructions are not presented to a service provider when providing transport service using the suggested route (i.e., using unguided realized routes). In one example, the dissimilarity module 320 calculates the guided path adherence ratio $T_g$ as:

$$T_g = \frac{N_{R,g}}{N_{P,g}} \quad (7)$$

and the unguided path adherence ratio $T_u$ as:

$$T_u = \frac{N_{R,u}}{N_{P,u}} \quad (8)$$

where the subscript u indicates unguided and the subscript g represents guided. Thus, $N_{R,g}$ indicate guided realized routes and $N_{R,u}$ represent unguided realized routes.

Dissimilarity module calculates a guided bound $B_g$ and an unguided bound $B_u$ for the guided path adherence ratio $T_g$ and the unguided path at adherence ratio $T_u$, respectively. In one example, dissimilarity module 320 calculates the guided bound as $B_g$:

$$B_g = \{T_g + t_{\beta,N_{P,g}+1} * \frac{s_g}{\sqrt{N_{P,g}}} \text{ if } T_g > 0 \quad 1 - \frac{1}{\alpha^{N_{P,g}+1}} \text{ if } T_g = 0 \quad (9)$$

and calculates the unguided bound $B_u$ as:

$$B_u = \max\left(0, \ T_U - t_{\beta,N_{P,u}-1} * \frac{s_u}{\sqrt{N_{P,u}}}\right) \quad (10)$$

where s is the variance of the expectation ratio T, t is the t score, α is 0.1, and β is 0.05. α and β can be other values.

Dissimilarity module 320 calculates a misleading score M using the unguided bound and the guided bound. In one example dissimilarity module 320 calculates the misleading score M as:

$$M = \frac{B_g}{B_u} \quad (11)$$

Given this formulation, a low misleading score M indicates that a guidance instruction is likely to misleading and cause a service provider to traverse an incorrect turn. Dissimilarity module 320 can determine a guidance instruction is misleading if the misleading score M is above a threshold (e.g., 2000).

Dissimilarity module 320 may take various actions to improve accuracy in determining misleading guidance instructions. For example, dissimilarity module 320 can filter misleading guidance instructions in a variety of manners to improve accuracy in determining misleading guidance instructions. As some examples, dissimilarity module 320 can (i) only calculate a misleading score M for a turn with $N_{P,u}$ greater than a threshold number, (ii) only calculate a misleading score M for turns with $N_{P,g}$ greater than a threshold number, and (iii) only calculate a mislead score M for turn adherence ratios less than a threshold.

Dissimilarity module 320 may cluster misleading guidance instructions. To do so, dissimilarity module 320 sorts the misleading guidance instructions by the type of turn they represent. For example, dissimilarity module 320 may sort guidance instructions for no-turn maneuvers, U-turns, left turns, etc. Dissimilarity module 320 may then group the misleading guidance instructions by the type of guidance instruction. For example, dissimilarity module 320 may group the misleading guidance instructions based on maneuver type, deviation of maneuver type, etc. Dissimilarity module 320 can determine an impact factor for misleading guidance instruction based on the number of misleading guidance instructions in each cluster. For example, the guidance instruction "turn left" may be less misleading than "veer left."

Generating an Alternate Route

FIG. 6 is a flow diagram illustrating a process 600 for determining an alternate route for a transport service based on route differences, according to one example embodiment. In this particular example, the route difference is caused by a change in a road state. In various embodiments, method 600 may be a particular implementation of method 200 of FIG. 2.

To begin, network system 130 coordinates 610 transport service between a set of service requestors and a set of service providers in an environment 100 including a road network. In particular, the set of service requestors request transport service from a first location to a second location. Network system 130 receives the requests and determines (e.g., step 210 of method 200) a suggested route from the first location to the second location using a map of the road network. The suggested route includes a set of road segments that allows service providers operating a transportation vehicle to provide transport to the service requestors from the first location to the second location. Network system 130 generates (e.g., step 220 of method 200) a predicted route including the set of road segments from the first location to the second location included in the suggested routes. Network system 130 assigns the transport services to service providers and transmits the suggested route to the service providers. The service providers travel to the first location using transportation vehicles. The service requestors enter the transportation vehicles of the service providers and the service providers begin providing transport service. The service provider providers transport service by attempting to traverse the road segments included in the suggested route. The service providers complete transport service by arriving at the second location.

As the service providers and service requestors travel from the first location to the second location, their client devices 110 transmit realized routes to network system 130 that reflect road segments travelled during the transport service. Network system 130 receives 620 the realized routes from the service providers and service requestors.

In this example, a construction project is occurring on a particular road segment of the suggested route. The construction project has closed the particular road segment to allow workers to traverse the road segment safely (i.e., the road segment has a "closed" state). As such, the service providers are unable to provide transport service using the particular road segment and, instead, service providers traverse an incorrect route rather than the suggested route to the second location. The incorrect route includes road segments that are not included in the suggested route, and, therefore, some of the realized routes received by network system 130 include road segments that are not included in the suggested route. In other words, there is a route difference between the realized routes received from the client devices 110 and the predicted routes for the suggested route.

Network system 130 determines road segments included in the route difference between the realized routes and the predicted routes. That is, network system 130 determines which road segments are included in a predicted route for a suggested route and not included in the realized route for the suggested route ("disparate road segment"). Here, the disparate road segment is the particular road segment that includes the construction project. As described above, network system may define road segments in realized routes and predicted routes as paths to determine disparate road segments.

Network system 130 determines 630 a current state score for the disparate road segment. The current state score is a quantification of how often the disparate road segment occurs in the realized routes received from service providers provided the suggested route for the transport service. To illustrate, network system 130 provides 1500 service providers the suggested route such that they may provide transport service from the first location to the second location. Because of the construction project on the particular road segment, 1483 of the service providers use an incorrect route while the remaining 5 service providers use the suggested route. Accordingly, none of the realized routes received from service providers taking an incorrect route include the disparate segment while all of the realized routes received from service providers taking the suggested route include the disparate road segment. Thus, in this example, the current state score for the disparate road segment is 0.01. The current state score may be determined in other manners as described above.

Network system 130 determines 640 (or accesses) a historic state score for the disparate road segment. The historic state score is a representation of how often the disparate road segment has previously occurred, or is expected to occur, in realized routes of service providers provided the suggested route. For example, before the construction project began, nearly every service provider provided the suggested route provides transport service along the suggested route. In other words, before the construction began there were very few route differences for the suggested route. As a quantitative example, in the past month 14,356 service providers provide transport service from the first location to the second location along the suggested route, while 251 service providers take the incorrect route. The realized routes received from service providers taking incorrect routes do not include the disparate road segment while the realized routes received from service providers taking the suggested route include the disparate road segment. Accordingly, the baseline state score is 0.98 for the disparate road segment. The baseline state score may be determined in other manners as described herein.

Network system 130 determines 650 a current state of the disparate road segment based on the difference between the historic state score and the current state score. In this example, the disparate road segment has a baseline state score of 0.98 and a current state score of 0.01. Network system 130 determines that the current state is "closed" because the difference between the state scores is above a first threshold (e.g., 0.90) indicating that the state has changed from "open" to "closed." Network system 130 may store the current state (and current state score) as the historic state and state score if the current state is dissimilar from the historic state. Determining the current state score can use the example approaches as described herein.

Network system 130 determines an alternate route based on the differences between the current state and the historic state of the disparate road segment. In this example, network system 130 determines 660 an alternate route because the historic state "open" is different from the current state "closed" for the disparate road segment. As such, network system 130 determines an alternate route from the first location to the second location that does not include the disparate road segment.

Network system 130 determines 660 the alternate route, rather than the suggested route, for any subsequent transport service requested from the first location to the second location. For example, network system receives a transport service request from the first location to the second location from a service provider. Network system 130 determines 660 the alternate route because the construction project has closed road segments along the suggested route.

Network system 130 transmits 670 the alternate route to the service providers such that the service providers can provide transport service from the first location to the second location without having to encounter the construction project.

For ease of description, the above example referenced a single suggested route from a first location to a second location. However, similar methodologies for determining a suggested route apply when using aggregated realized routes. For example, suggested routes from a variety of first locations to a variety of second locations may include a particular road segment. Accordingly, a construction project including the particular road segment, for example, can cause route differences across various suggested routes. Thus, network system 130 can access aggregated realized routes and aggregated predicted routes for a particular road segment when determining a current state score, a historic state score, and/or a current state of a road segment. To illustrate, for example, the construction project may cause several thousand transport service providers to take incorrect routes for several hundred suggested routes. In this case, the disparate road segment occurs in realized routes across the several hundred suggested routes while the construction project is occurring.

Additionally, for ease of description, the above example referenced a route difference including a single disparate road segment. However, in various examples, route differences can include several disparate road segments. Network system 130 may determine current state scores, historic state scores, and current states of any number of the disparate road segments. For example, a construction project includes three road segments and a suggested route includes two of the three road segments. In this case, network system 130 can determine that the disparate road segments are the two road segments on which the construction project occurs that are also included in the suggested route. Network system 130 may generate an alternate route that does not includes the two disparate road segments.

Modifying Guidance Instructions

FIG. 7 is a flow diagram illustrating a process 700 for modifying guidance instructions for a transport service based on route differences, according to one example embodiment. In this particular example, the route differences are caused by an inaccurate guidance instruction. In various embodiments, method 700 may be a particular implementation of method 200 of FIG. 2.

To begin, network system 130 coordinates 710 transport service similarly to step 610 of method 600. That is, a set of service requestors request transport service from a first location to a second location, network system determines a suggested route for the transport service, network system generates a predicted route for the suggested route, and service providers attempt to provide transport service using the suggested route. The service providers and service requestors transmit realized routes to network system 130 as they coordinate transport service and network system 130 receives 720 the realized routes. The service providers complete transport service by arriving at the second location.

In this example, however, the network system 130 determines (or accesses) a number of guidance instructions to assist service providers in providing transport service. More particularly, the guidance instructions are a set of audio and/or visual cues (e.g., "Turn right in 1000 feet.") to be played back by a client device 110 at certain coordinates along the suggested route. In some cases, the guidance instructions are generated and provided to a client device 110 by a third party system.

Here, a guidance instruction of the set of guidance instructions provided to the service providers for the suggested route is misleading. The misleading guidance instruction may cause service providers to traverse an incorrect route rather than the suggested route. The misleading guidance instruction may say, for example, "Veer right in 1000 feet" when traversing the suggested route. However, rather than veering right to traverse the suggested route, a service provider must turn right onto a new road segment to traverse the suggested route. Thus, some service providers using the misleading guidance instructions may veer right and miss the turn, while other service providers not using the misleading guidance instructions may correctly turn right onto the new road segment. As such, some of the service providers traverse an incorrect route that includes a particular road segment not included in the suggested route. Thus, some of the realized routes received by network system 130 include road segments that are not included in the suggested route. In other words, there is a route difference between the realized routes and the predicted routes for some of the service providers.

Network system 130 determines disparate road segments for the suggested route. As described above, network system may define paths using realized routes and predicted routes when determining disparate road segments. Here, the disparate road segment is the particular road segment traversed because of the misleading guidance instruction. In some examples, network system 130 only analyzes guided realized routes when determining a misleading guidance instruction.

Network system 130 determines 730 a current state score for the disparate road segment. The current state score is a quantification of how often the disparate road segment occurs in the realized routes received from service providers provided the suggested route for the transport service. To illustrate, network system 130 provides 1000 service providers the suggested route and corresponding guidance instructions for the transport service. Because of the misleading guidance instruction, 332 of the service providers use an alternate route while the remaining 728 service providers use the suggested route. Accordingly, none of the realized routes received from service providers taking the incorrect route include the disparate segment while all of the realized routes received from service providers taking the suggested route include the disparate road segment. Thus, in this example, the current state score for the disparate road segment is 0.63. The current state score may be determined in other manners as described herein.

Because the current state score is below a threshold (e.g., 0.85), network system 130 determines if any of the guidance instructions provided to service providers for the suggested route are misleading. To do so, network system 130 accesses 740 the guidance instructions for the suggested route that is provided to service providers. In some cases, network system 130 may access the instructions from a third party system. Alternatively, if the third-party guidance instructions are received by a client device 110 for play-back from a third-party system, application 410 may input the guidance instructions and transmit them to network system 130.

Network system 130 determines 750 the misleading guidance instruction causing service providers to traverse the disparate road segment. In one example, network system 130 determines that the guidance instruction immediately preceding the disparate road segment is the misleading guidance instruction. In other examples, network system determines a likelihood (e.g., a misleading score) that a guidance instruction is misleading. The likelihood may be based on the route differences for service providers using guidance instructions on a suggested route and service providers not using guidance instructions on the suggested route as described herein. Further, the network system 130 may determine a likelihood for any number of guidance instructions preceding the disparate road segment and select the guidance instruction with the highest likelihood as the misleading guidance instruction. To illustrate, using the above example, perhaps the guidance instruction preceding "Veer right in 1000 feet" is "Follow the left lane onto Highway 103." In this situation, a necessary transition from the left lane to the right lane to achieve the right turn crosses several lanes of traffic. As such, many service providers prompted to "Veer right in 1000 feet" miss the turn when trying to cross the lanes of traffic. In this case, when accessing aggregate trace data, network system 130 determines that the likelihood of the "veer right" guidance instruction being misleading is lower than the "follow the left lane" guidance instruction. As such, network system 130 determines the "follow the left lane" guidance instruction is misleading. Many other examples are possible. Network system 130 may associate an indicator for determined misleading guidance instructions in datastore 330. The indicators may be accessed for by an administrator of network system 130 such that the administrator may modify the guidance instructions to make them less misleading.

Network system 130 modifies 760 the misleading guidance instruction to increase the number of service providers traversing the suggested route rather than the incorrect route. In other words, network system 130 modifies the misleading guidance instruction to decrease the number of route differences for a suggested route. Network system 130 can modify 760 a misleading guidance instruction in a variety of ways. For example, network system 130 can change the location at which the misleading guidance instruction is presented to a service provider, modify the language of the misleading guidance instruction, remove the misleading guidance instruction, replace the misleading guidance instructions, or add a misleading guidance instruction to the set of guidance instructions that lessens the effect of the misleading guidance instruction.

Network system 130 stores the modified guidance instruction for future use for transport service using the suggested route. For example, network system 130 receives a number of transport service requests from the first location to the second location from service providers. Network system 130 determines the suggested route and guidance instructions for the transport service. However, in this case, the guidance instructions include the modified guidance instruction(s) rather than the misleading guidance instruction. Network system 130 transmits the suggested route and guidance instruction to the service providers such that the service providers can provide transport service from the first location to the second location. Because the guidance instructions include the modified guidance instruction, fewer service providers miss the turn and take incorrect routes.

Network system 130 may be configured to continuously improve misleading guidance instructions. To illustrate, using the previous example, the modified guidance instruction improves the current state score by causing more people to appropriately take the right turn. However, the current state score remains below the threshold despite a larger number of service providers appropriately taking the right turn. Accordingly, network system 130 continuously modifies 760 the guidance instruction until the current state score is above the threshold.

For convenience, the above example referenced a single suggested route from a first location to a second location. However, similar methodologies for determining a modified guidance instruction apply when using aggregated realized routes. For example, suggested routes from a variety of first locations to a variety of second location may include a particular road segment. For any of the various road segments included in the suggested routes, guidance instructions may be similar. For example, several suggested routes may include a right turn from a first segment to a second segment and the guidance instructions for that particular right turn are the same between suggested routes. Thus, network system 130 can access aggregated realized routes and aggregated predicted routes for a particular road segment when determining a current state score, accessing a set of guidance instructions, determining an inaccurate guidance instruction, and/or modifying the inaccurate guidance instruction. To illustrate, for example, an inaccurate guidance instruction may cause several thousand transport service providers to traverse incorrect routes over several hundred suggested routes. In this case, the disparate road segment across the several hundred suggested routes is the road segment including an inaccurate guidance instruction. Thus, network system 130 can determine and modify the inaccurate guidance instruction for the disparate road segment accordingly.

Example Computer System

Figure 8:
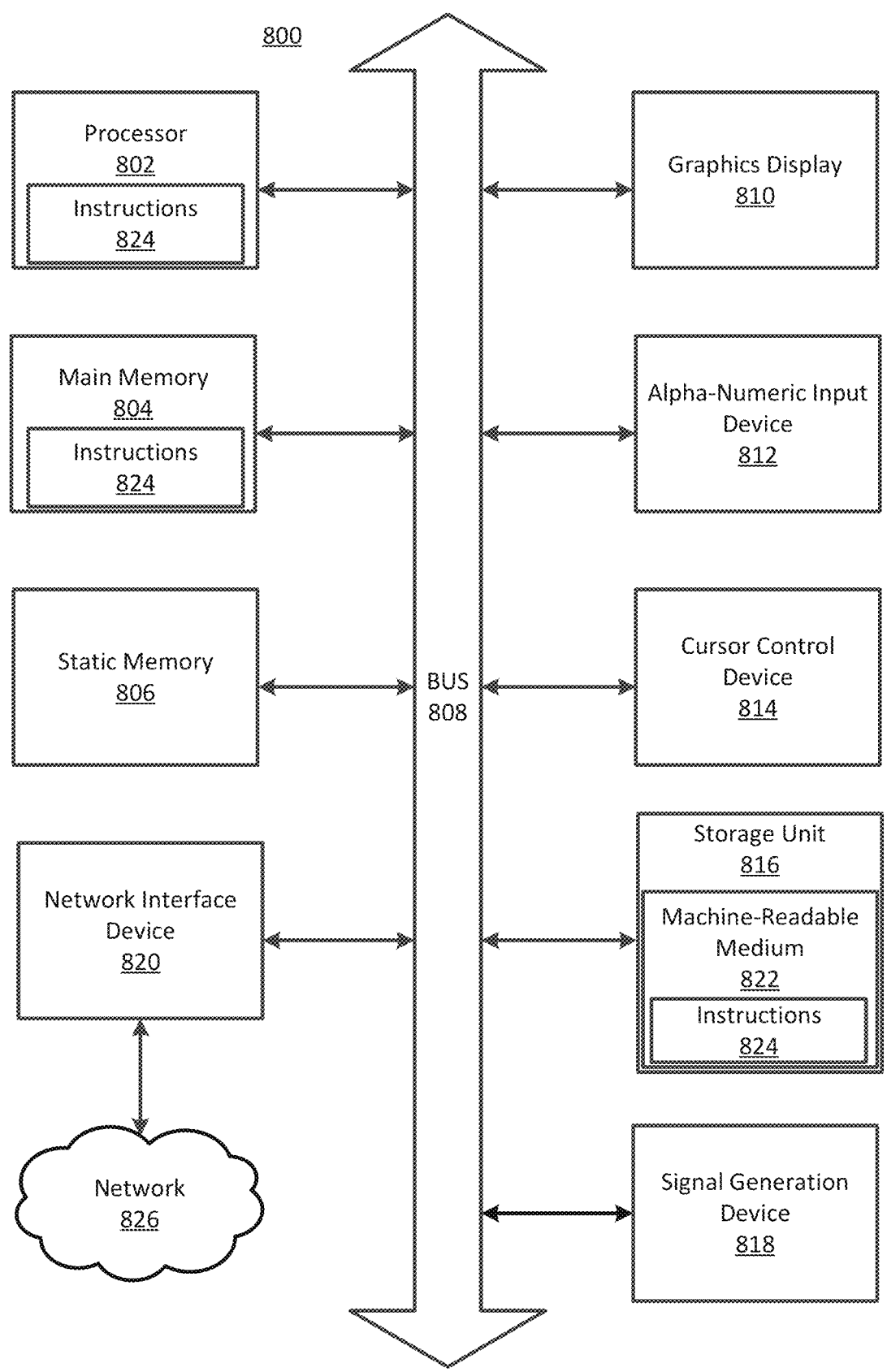
FIG. 8 is an illustration of an example machine for reading and executing instructions from a machine-readable medium, in accordance with some embodiments.

FIG. 8 is a block diagram illustrating components of an example machine for reading and executing instructions from a machine-readable medium. Specifically, FIG. 1 shows a diagrammatic representation of network system 130 and client device 110 in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 800, or as a peer machine in a peer-to-peer (or distributed) system environment 800.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the system 830 described in FIG. 1. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 (e.g., network 120) via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

Alternative Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. For example, while the present disclosure discusses predicting provider involvement in potential safety incidents, the methods and systems herein can be used more generally for any purpose where one would want to predict involvement in potential incidents using a machine learning model.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer executed method for determining an alternate route based on a state of a particular road segment in a road network using a processor, the method comprising:

receiving telematics data representing a plurality of realized routes, each realized route including a plurality of road segments traversed by a client device along a route in the road network from a first location to a second location and wherein the telematics data represents a stream of GPS location data received as client devices travel realized routes;

determining a plurality of paths from the plurality of road segments, wherein each path includes three road segments and two nodes connecting the three road segments and the plurality of paths, in aggregate, represent the plurality of realized routes;

for a particular path of the plurality of paths:
determining a current score representing how often the particular path including three road segments and two nodes connecting the three road segments occurs in the received plurality of realized routes;

accessing a historic score representing how often the particular path including three road segments and two nodes connecting the three road segments is expected to occur in traces traversing the road network from the first location to the second location along a suggested route;

determining a current state of the particular path based on a difference between the historic score and the current score; and responsive to the determined current state being different than a historic state for the particular road segment, storing the current state for the particular path including three road segments and two nodes connecting the three road segments as the historic state of the particular path including three road segments and two nodes connecting the three road segments.

2. The computer-executed method of claim 1, wherein determining the current score further comprises:
   determining an expectation ratio, the expectation ratio being a ratio of how often a path of the plurality of paths is suggested as part of the suggested route to how often the path of the plurality of paths occurs in the realized routes.

3. The computer-executed method of claim 2, further comprising:
   calculating a bound for the expectation ratio; and
   determining if the current score is one over the bound.

4. The computer-executed method of claim 3, wherein the bound is a first result to a first function if the expectation ratio is greater than zero, and the bound is a second result to a second function if the expectation ratio is zero.

5. The computer-executed method of claim 1, wherein determining the current score further comprises:
   determining an expectation ratio, the expectation ratio a ratio of how often the particular path of the plurality of paths occurs in the plurality of realized routes to how often the particular path of the plurality of paths suggested as part of the suggested route.

6. The computer-executed method of claim 1, wherein the determined state is any of opened, closed, or intermittently open.

7. The computer-executed method of claim 1, further comprising:
   determining an alternate suggested route from the first location to the second location, the alternate route not including the particular path.

8. The computer-executed method of claim 7, further comprising:
   receiving from the client device a request for a recommended route from the first location to the second location; and
   transmitting the alternate suggested route to the client device.

9. The computer-executed method of claim 1, further comprising:
   responsive to the determined current state being different than the historic state for the particular path, determining the difference for the particular path indicates the particular path is missing a turn restriction based on the state score.

10. A non-transitory computer-readable storage medium storing computer instructions for determining an alternate route based on a state of a particular road segment in a road network, the computer instructions, when executed by one or more processors, causing the one or more processors to:
    receive telematics data representing a plurality of realized routes, each realized route including a plurality of road segments traversed by a client device along a route in the road network from a first location to a second location and wherein the telematics data represents a stream of GPS location data received as client devices travel realized routes;
    determine a plurality of paths from the plurality of road segments, wherein each path includes three road segments and two nodes connecting the three road segments and the plurality of paths, in aggregate, represent the plurality of realized routes;
    for a particular path of the plurality of paths:
        determine a current score representing how often the particular path including three road segments and two nodes connecting the three road segments occurs in the received plurality of realized routes;
        access a historic score representing how often the particular path including three road segments and two nodes connecting the three road segments is expected to occur in traces traversing the road network from the first location to the second location along a suggested route;
        determine a current state of the particular path including three road segments and two nodes connecting the three road segments based on a difference between the historic score and the current score; and
        responsive to the determined current state being different than a historic state for the particular road segment, store the current state for the particular path including three road segments and two nodes connecting the three road segments as the historic state of the particular path including three road segments and two nodes connecting the three road segments.

11. The non-transitory computer-readable storage medium of claim 10, wherein the computer instructions that cause the one or more processors to determine a current score further cause the one or more processors to:
    determine an expectation ratio, the expectation ratio being a ratio of how often a path of the plurality of paths is suggested as part of the suggested route to how often the path of the plurality of paths occurs in the plurality of realized routes.

12. The non-transitory computer-readable storage medium of claim 11, wherein the computer instructions, when executed by the one or more processors, cause the one or more processors to:
    calculate a bound for the expectation ratio; and
    determine if the current score is one over the bound.

13. The non-transitory computer-readable storage medium of claim 12, wherein the bound is a first result to a first function if the expectation ratio is greater than zero, and the bound is a second result to a second function if the expectation ratio is zero.

14. The non-transitory computer-readable storage medium of claim 10, wherein the computer instructions that cause the one or more processors to determine the current score further cause the one or more processors to:
    determine an expectation ratio, the expectation ratio a ratio of how often the path of the plurality of paths occurs in the plurality of realized routes to how often the path of the plurality of paths suggested as part of the suggested route.

15. The non-transitory computer-readable storage medium of claim 10, wherein the computer instructions, when executed by one or more processors, cause the one or more processors to:
    determine an alternate suggested route from the first location to the second location, the alternate route not including the particular path.

16. The non-transitory computer-readable storage medium of claim 15, wherein the computer instructions, when executed by one or more processors, cause the one or more processors to:
    receive from a client device a request for a recommended route from the first location to the second location; and
    transmit the alternate suggested route to the client device.

17. The non-transitory computer-readable storage medium of claim 10, wherein the computer instructions further cause the one or more processors to:

responsive to the determined current state being different than the historic state for the particular path, determine the difference for the particular path indicates the particular path is missing a turn restriction based on the state score.

18. A system for executing a method for determining an alternate route based on a state of a particular road segment in a road network, the system comprising:
  one or more processors; and
  a non-transitory, computer-readable storage medium storing computer program modules executable by one or more processors to perform steps comprising:
    receiving telematics data representing a plurality of realized routes, each realized route including a plurality of road segments traversed by a client device along a route in the road network from a first location to a second location and wherein the telematics data represents a stream of GPS location data received as client devices travel realized routes;
    determining a plurality of paths from the plurality of road segments, wherein each path includes three road segments and two nodes connecting the three road segments and the plurality of paths, in aggregate, represent the plurality of realized routes;
    for a particular path of the plurality of paths:
      determining a current score representing how often the particular path including three road segments and two nodes connecting the three road segments occurs in the received plurality of realized routes;
      accessing a historic score representing how often the particular path including three road segments and two nodes connecting the three road segments is expected to occur in traces traversing the road network from the first location to the second location along a suggested route;
      determining a current state of the particular path including three road segments and two nodes connecting the three road segments based on a difference between the historic score and the current score; and
      responsive to the determined current state being different than a historic state for the particular including three road segments and two nodes connecting the three road segments, storing the current state for the particular path as the historic state of the particular path including three road segments and two nodes connecting the three road segments.

19. The system of claim 18, wherein the computer program instructions further cause the processor to perform steps comprising:
  responsive to the determined current state being different than the historic state for the particular path, determining the difference for the particular path indicates the particular path is missing a turn restriction based on the state score.

* * * * *